3,697,218
FLAME-PROOF FIBERS

Akira Nakajima, Saidaiji, Japan, and Hiroshi Suzuki, Wayne, N.J., assignors to American Cyanamid Company, Stamford, Conn.
No Drawing. Original application Dec. 16, 1965, Ser. No. 514,395. Divided and this application Aug. 27, 1969, Ser. No. 853,535
Int. Cl. D06
U.S. Cl. 8—115.5
4 Claims

ABSTRACT OF THE DISCLOSURE

A process for preparing flame-proof polymers, particularly in fiber form, comprising reacting a polymeric material containing, as one constituent thereof, a polymerized ethylenically unsaturated glycidyl compound with a bromine, chlorine, and/or phosphorus compound capable of reacting with epoxy groups. Preferably such reaction is conducted after said polymer is spun into fiber form.

---

This application is a division of application Ser. No. 514,395, filed Dec. 16, 1965, now abandoned.

This invention relates to flame-proof or fire-retardant polymeric materials and to the preparation thereof. More particularly, this invention is founded upon our discovery that polymeric materials can be made flame-proof or fire-retardant by (a) incorporating therein, in the form of a copolymer, graft-copolymer, or block-copolymer, an ethylenically unsaturated glycidyl compound and then (b) reacting the epoxy moiety of such polymeric material with a bromine-, chlorine-, or phosphorus-containing compound to chemically combine such compound with such polymeric material.

Many methods are known for flame-proofing polymeric materials in the form of moldings of fibers. Such methods usually involve mechanically mixing with depositing the flame-proofing agent in the polymeric material or on the surfaces thereof. By merely physically mixing or depositing the flame-proofing agent in or on the polymeric material, satisfactory performance of the flame-proofing effect cannot be achieved since the flame-proofing agent can be easily separated from the polymeric material by the action of water, e.g., during washing or dyeing, or by organic solvent, e.g. during dry cleaning.

Prior to the present invention, numerous types of such flame-proofing agents were known. Generally, these agents were compounds of bromine, chlorine, or phosphorus which were usually organic compounds. According to the present invention, a permanent flame-proofing or fire-retardant property is imparted to the polymeric materials by chemically combining into the polymer molecule the flame-proofing agent, which may be a bromine-, chlorine-, or phosphorus-containing compound.

In order to combine such compounds into the polymeric material, we have found that it is feasible to incorporate into the polymer molecules ethylenically unsaturated glycidyl compounds, as copolymers, graft-copolymers, or block-copolymers. When such glycidyl compounds are so incorporated into the polymer molecules, the reactive epoxy moiety serves as a point of attachment for the flame-proofing agent. When so combined through the epoxy moiety incorporated into the polymeric material by the inclusion therein of the glycidyl compound, the flame-proofing agent cannot be separated by the normal treatments with water or organic solvents and the flame-proofing behavior is permanent.

Ethylenically unsaturated glycidyl compounds that can be used in the present invention are glycidyl esters of unsaturated organic acids, e.g., glycidyl acrylate, glycidyl methacrylate, glycidyl crotonate, monoglycidyl maleate, diglycidyl maleate, diglycidyl fumarate and diglycidyl itaconate; glycidyl esters of unsaturated sulfonic acids, e.g., glycidyl allyl sulfonate and glycidyl methallyl sulfonate; glycidyl esters of unsaturated carbamic acids, e.g., glycidyl vinyl carbamate, glycidyl isopropenyl carbamate, and glycidyl crotonyl carbamate; and unsaturated glycidyl ethers, e.g., allyl glycidyl ether, vinyl glycidyl ether and methallyl glycidyl ether.

Illustrative of the polymeric materials that can be used in the practice of the present invention are (a) copolymers of such ethylenically unsaturated glycidyl compounds with other ethylenically unsaturated comonomers, such as acrylonitrile, styrene, vinyl acetate, methyl methacrylate, vinylpyridines, etc., (b) copolymers obtained by graft-copolymerizing such ethylenically unsaturated glycidyl compounds onto such polymeric materials as cellulose, polyvinyl alcohol, polyethylene, polypropylene, polyacrylonitrile, polystyrene, polyamide, polyester and polyurethane and copolymers thereof and (c) block-copolymers obtained by block-copolymerizing ethylenically unsaturated glycidyl compounds at the terminals of such polymeric materials as living polystyrenes.

When a polymeric material into which has been introduced an ethylenically unsaturated glycidyl compound as one constituent thereof is reacted with a flame-proofing agent which will introduce bromine, chlorine, or phosphorus into the polymer molecules, such as hydrogen bromide, hydrogen chloride, bromal, chloroal, phosphorus trichloride, phosphorus tribromide, antimony trichloride, antimony tribromide, phosphorus oxybromide, such dialkyl esters of orthophosphoric acid as dibutyl phosphate, such monoalkyl esters of orthophosphoric acid as ethyl phosphate, such phenol halides as 2,4,6-tribromophenol, or such aniline halides as 2,4,6-tribromaniline, or their derivatives, the flame-proofing agent will chemically react with the epoxy moiety of the unsaturated glycidyl moiety in the polymeric material so that a flame-proof radical may be permanently introduced into the polymer. As explained in "Heterocyclic Compounds With Three- and Four-Membered Rings," edited by A. Weissberger (published 1964 by Interscience Publishers), Part 1, Chapter 1, particularly pages 270–459 thereof, numerous compounds can react with epoxy moieties by a variety of reactions to produce many diverse products wherein the epoxy ring is opened and such compounds become combined therewith. Where such compounds contain bromine, chlorine, or phosphorus, the polymeric material would then contain flame-retardant agents chemically combined therein.

The present invention shall now be explained with reference to the following examples in which percent and parts are by weight.

EXAMPLE 1

One part of fibers of a copolymer of 78.4% acrylonitrile and 21.6% glycidyl methacrylate was soaked in a solution consisting of 270 parts of acetone and 30 parts of phosphorus trichloride at 40° C. for 30 minutes. After this treatment, the fibers were well washed to completely remove the unreacted phosphorus trichloride, and were then dried completely. When such treated fibers were thrown into an electric furnace at 600° C., they discharged only a decomposition gas but did not ignite. In contrast, similar fibers which were untreated ignited in about 1.5 seconds and burned.

EXAMPLE 2

One part of the untreated fibers of Example 1 was reacted at 40° C. for 15 minutes in a solution of 5 parts of phosphorus trichloride in 295 parts of acetonitrile. After the reaction, the fibers were well washed to completely remove the unreacted phosphorus trichloride, and were then dried completely. When such treated fibers were thrown into an electric furnace at 600° C., they discharged only a decomposition gas but did not ignite.

EXAMPLE 3

One part of the untreated fibers of Example 1 was reacted at 70 to 75° C. for 15 minutes in a solution of 270 parts of dioxane containing 30 parts of an aqueous solution of 47% hydrogen bromide. After the reaction, the fibers were well washed and were dried completely. When such treated fibers were thrown into an electric furnace at 600° C., they discharged only a decomposition gas but did not ignite.

EXAMPLE 4

One part of the untreated fibers of Example 1 was treated at 40° C. for 15 minutes in a solution consisting of 5 parts of phosphorus trichloride in 295 parts of acetonitrile. The fibers then were well washed and dried completely. When the thus treated fibers were brought into contact with a flame of an alcohol lamp, they burned. But, as soon as the flame of the alcohol lamp was taken away, the fire went out by itself. In contrast, even when the alcohol lamp was taken away, similar fibers which were untreated continued to burn until they completely burned out when similarly tested.

EXAMPLE 5

Five parts of a copolymer of 84% acrylonitrile and 16% glycidyl methacrylate were reacted at 50° C. for 30 minutes with a solution of 1 part of an aqueous solution of 47% hydrogen bromide in 44 parts of dimethyl formamide after which it was molded into a film 150 mm. long, 20 mm. wide and 0.067 mm. thick. When the film was burned and tested, it took 28.5 seconds for the film to completely burn. In contrast, when a film molded of a similar copolymer which had not been so treated to be flameproof was burned and tested under the same conditions, it took 10.7 seconds for the film to burn out.

We claim:

1. A process for forming flame-proof fibers comprising spinning a fiber-forming acrylonitrile copolymer containing polymerized therewith an ethylenically unsaturated glycidyl compound, into fiber form and then reacting the thus produced acrylonitrile copolymer fiber with a compound selected from the group consisting of bromine compounds, chlorine compounds, and phosphorus compounds capable of reacting with epoxy groups.

2. Flame-proof fibers produced by the process of claim 1.

3. A process as defined in claim 1 wherein said polymeric material comprises a copolymer of acrylonitrile and glycidyl methacrylate.

4. Flame-proof fibers produced by the process of claim 3.

References Cited

UNITED STATES PATENTS 3,210,315  10/1965  Blackburn et al. _____ 260—31.2
2,692,876  10/1954  Cupery _____ 260—86.7

FOREIGN PATENTS 769,027  2/1957  Great Britain.

OTHER REFERENCES

"Fireproofing of Polymers With Derivatives of Phosphines and With Halogen-Phosphorus Compounds," Boyer et al.: SPE Transactions, January 1964 pp. 45–55.

JOHN C. COOPER III, Primary Examiner

U.S. Cl. X.R.

260—85.5 B, 85.5 S, DIG. 24